United States Patent Office 2,858,346
Patented Oct. 28, 1958

2,858,346
PROCESS OF RECRYSTALLIZING NITRO EXPLOSIVES

Albert Fernand Marie Diels, Brussels, Belgium, and Hermann Orth, Ludwigshafen-Oggersheim, Germany, assignors to Poudreries Reunies de Belgique, Brussels, Belgium, a corporation of Belgium No Drawing. Application June 10, 1954
Serial No. 435,914

Claims priority, application Germany June 12, 1953

1 Claim. (Cl. 260—645)

The present invention relates to a process of recrystallizing trinitro toluene and other nitro explosives and more particularly to a continuous process of recrystallizing trinitro toluene and other nitro explosives by means of nitric acid.

It is known to recrystallize trinitro toluene from nitric acid in order to purify said product and to produce a product of a high specific gravity. Thereby the recrystallization process is carried out in batch operation. For this purpose, trinitro toluene is first dissolved in hot nitric acid. The resulting solution is then cooled and thereby caused to crystallize. The acid is removed therefrom by filtration and is used in varying concentrations for washing the precipitated crystals. In this manner the acid is kept in circulation, the isomers of trinitro toluene, also known as asymmetric trinitro toluenes, are separated from the least concentrated acid filtrates and wash liquids, and the remaining acid is finally subjected to a concentration operation so that it can again be used for recrystallization. This mode of operation yields trinitro toluene, i. e. α-trinitro toluene or symmetric trinitro toluene, known as TNT, which meets highest ballistic requirements. The acid balance of this recrystallization and purification process, however, is very unsatisfactory.

It is one object of the present invention to provide a simple and effective purification and recrystallization process for trinitro toluene with a practically ideal acid balance which process considerably reduces production costs of said nitro explosive.

Another object of this invention consists in providing a process of separating the isomers of trinitro toluene from trinitro toluene and of recovering the nitric acid used in such a purification and recrystallization process.

Other objects of this invention and advantageous features thereof will become apparent as the description proceeds.

The procedure followed in carrying out the present invention is substantially the same as that used in the known recrystallization process. In contrast to said known processes the nitric acid used for recrystallization is adjusted in its content of free nitric acid (HNO$_3$) in such a manner that the amount of said acid which is used for purification and recrystallization corresponds to the amount which is required for nitration and that its concentration is higher than 36° Baumé. For this purpose crude trinitro toluene is dissolved in such a nitric acid and is then caused to crystallize by cooling from the resulting solution in nitric acid, and the separated acid is returned into the di-nitration or the trinitration steps. Nitro compounds which remain dissolved in said recrystallization acid consequently remain in the nitration process. In this manner an ideal acid balance is achieved and the production costs are considerably reduced. The crystals of trinitro toluene precipitated from the nitric acid solution are further processed in a manner known per se, washed, freed from isomers and subjected to other conventional purification and processing steps to finally yield symmetric trinitro toluene known as TNT.

The nitric acid after it has been used for recrystallization is preferably diluted by the addition of water to a concentration of 36° Baumé whereby the asymmetric isomers are readily precipitated. Said isomers can be used as nitro compounds with a low solidification point for the production of safety explosives. Consequently, practically all the isomers obtainable on recrystallization are withdrawn from the process, and the mother liquor remaining thereafter is again used as concentrated nitric acid in the nitration process.

Preferably crystallization and filtration are carried out in such a manner that trinitro toluene is continuously dissolved, is allowed to crystallize, for instance, by continuously passing through a centrifuge having an externally cooled basket and the precipitated crystals are separated from the mother liquor by means of a centrifuge or of a revolving filter. Thereafter the remaining nitric acid is returned into the nitration process.

An advantageous procedure of effecting crystallization of trinitro toluene from its solution in nitric acid comprises pumping said solution of trinitro toluene through a cooled pipe system.

It is understood, of course, that the new method of operation is not limited to trinitro toluene and that nitration with the mother liquor-nitric acid can also be carried out in the manufacture of other nitro explosives which are produced, purified and recrystallized according to the same principles of operation.

The new procedure may preferably be employed in combination with such nitration processes wherein the hydrocarbon to be nitrated is passed through the nitrating apparatus in countercurrent to the nitrating acid and whereby nitration is effected in a 2-step process involving a di-nitrating zone and a tri-nitrating zone. The spent acid discharged from the di-nitration zone is stirred with mononitro toluene and is then, for instance, denitrated while the spent acid discharged from the tri-nitration zone is reenforced by means of nitric acid and is used for di-nitration. Such a process is described more in detail in our co-pending application Serial No. 434,910, which was filed June 7, 1954, and now abandoned, said application being entitled "Multiple-Step Process of Producing Trinitro Toluene."

It is also possible to treat the nitration products, after they have been purified and recrystallized according to the present invention, with the usual washing agents in injectors as this is disclosed in our above indicated co-pending application Serial No. 434,910.

In principle, the process according to the present invention is characterized by the feature that the amount of nitric acid used for recrystallization and its concentration is adjusted in such a manner that the amount of nitric acid which remains as mother liquor after recrystallization is sufficient to permit direct use of said nitric acid mother liquor as nitrating acid after separating therefrom the nitro compounds dissolved therein.

Of course, many other changes and variations in the amounts of nitric acid used, its concentration, the separation of the nitro compounds remaining dissolved therein and the like may be made by those skilled in the art in accordance with the principles set forth herein and in the claim annexed hereto.

We claim:

In a process of continuously recrystallizing trinitro toluene by means of nitric acid, the steps comprising dissolving crude trinitro toluene in aqueous nitric acid of a concentration substantially higher than about 36° Baumé, cooling the resulting solution, separating the crystallized trinitro toluene from the mother liquor, diluting said mother liquor by the addition of water to a nitric acid concentration of 36° Baumé, and separating the precipitated asymmetric trinitro toluene isomers from the resulting nitric acid mother liquor.

References Cited in the file of this patent

UNITED STATES PATENTS

| | | |
|---|---|---|
| 1,166,546 | Reuter | Jan. 4, 1916 |
| 2,347,660 | Burtle | May 4, 1944 |
| 2,402,180 | Papazoni | June 18, 1946 |

OTHER REFERENCES

Ministry of Munitions and Dept. of Scientific and Industrial Research, "Technical Records of Explosive Supply 1915–1918 (No. 2, Manufacture of Trinitrotoluene)"; publ. by His Majesty's Stationery Office (London, 1920).